(12) United States Patent
Markow et al.

(10) Patent No.: US 6,195,437 B1
(45) Date of Patent: Feb. 27, 2001

(54) METHOD AND APPARATUS FOR INDEPENDENT GAIN CONTROL OF A MICROPHONE AND SPEAKER FOR A SPEAKERPHONE MODE AND A NON-SPEAKERPHONE AUDIO MODE OF A COMPUTER SYSTEM

(75) Inventors: Mitchell A. Markow; Jeremy Ford, both of Spring; Ji-An Gong, Houston, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 08/941,580

(22) Filed: Sep. 30, 1997

(51) Int. Cl.[7] .................................................. H04B 15/00
(52) U.S. Cl. .............................................. 381/93; 379/406
(58) Field of Search .............................. 381/95, 96, 108, 381/93, 88, 83; 379/61, 90, 110, 389, 388, 390, 406, 110.01, 90.01; 179/81, 1

(56) References Cited

U.S. PATENT DOCUMENTS

| | | | |
|---|---|---|---|
| 4,555,596 | * | 11/1985 | Blomley .................................. 179/81 |
| 5,414,776 | * | 5/1995 | Sims, Jr. ................................. 381/119 |
| 5,424,678 | * | 6/1995 | Heyl et al. ............................... 330/51 |
| 5,696,814 | * | 12/1997 | Tran et al. ............................ 379/110.01 |
| 5,768,364 | * | 6/1998 | Karnowski et al. ................... 379/388 |
| 5,875,120 | * | 2/1999 | Matsushima et al. ................ 364/707 |
| 5,999,052 | * | 12/1999 | Tang .................................... 330/254 |

OTHER PUBLICATIONS

ESS Technology, Inc., "ES 1879 Data Sheet—Preliminary: Pinout; Pin Description; Functional Description; Mixer Schematic Block Diagram; and Typical Application," pp. 5–11.
Don Lancaster, CMOS Cookbook, pp. 352–353, 1979.*

* cited by examiner

Primary Examiner—Forester W. Isen
Assistant Examiner—Brian Tyrone Pendleton
(74) Attorney, Agent, or Firm—Akin, Gump, Strauss, Hauer & Feld, LLP (57) ABSTRACT

A method and apparatus for controlling acoustic gain during a non-speakerphone audio mode of computer system independent of acoustic gain during a speakerphone mode of the computer system is provided. The BIOS code of the computer system detects whether the computer system is in a speakerphone mode or a non-speakerphone audio mode. If the computer system is in a speakerphone mode, an upper gain limit is not applied to the microphone path of the computer system. If the computer system is in a non-speakerphone audio mode, a predetermined upper gain limit is applied to the microphone path of the computer system. The predetermined upper gain limit is preferably applied to the microphone path at either a microphone pre-amplifier or an audio mixer chip in the microphone path of the computer system.

28 Claims, 5 Drawing Sheets

METHOD AND APPARATUS FOR INDEPENDENT GAIN CONTROL OF A MICROPHONE AND SPEAKER FOR A SPEAKERPHONE MODE AND A NON-SPEAKERPHONE AUDIO MODE OF A COMPUTER SYSTEM

BACKGROUND OF THE INVENTION

1. Field of the Invention

The present invention relates to computer systems having a microphone and a loudspeaker, and more particularly, to computer systems providing a speakerphone mode and non-speakerphone audio modes.

2. Description of the Related Art

Often in a computer system, a loudspeaker and microphone are turned on for various modes of a computer system such as a speakerphone mode or non-speakerphone audio modes. Examples of non-speakerphone audio modes include a recording mode, a playback mode, and an idle mode. When both the microphone and loudspeaker are turned on but not in use, noise has been generated and amplified by the acoustic loop formed by the microphone and loudspeaker. In a speakerphone mode of a computer system, an automatic gain control circuit of a digital signal processor has been used to reduce the gain in the acoustic loop thereby eliminating such noise. However, in a non-speakerphone audio mode of a computer system, a digital signal processor is not included in the acoustic or microphone path of the computer system. Since the automatic gain control circuit of the digital signal processor is not within the microphone path of a computer system during a non-speakerphone audio mode, noise is undesirably generated and amplified by the acoustic loop formed by the microphone and loudspeaker in a non-speakerphone audio mode.

The amplified noise is received and acoustically transmitted by the loudspeaker. Since the loudspeaker is acoustically coupled to the microphone, the amplified noise returns again to the microphone and is again amplified by the acoustic loop formed by the microphone and loudspeaker. The microphone and loudspeaker of the computer system thus are placed into a feedback loop of a high gain, rendering the computer system acoustically unstable. The resulting acoustic feedback is manifested to a user as an irritating whining or screaming noise.

When the acoustic feedback takes the form of this irritating whining noise, the computer user may be operating other applications of the computer system such that the source of the noise is hidden or not apparent to the user. The user therefore is required to interrupt its use of these applications in an effort to determine the source and cause of the irritating noise. Such a determination is particularly challenging to a user where the user has exited the particular software application in which the microphone and loudspeaker were turned on.

Moreover, the hidden problem of feedback noise generated in a non-speakerphone audio mode of a computer system is propounded by a microphone path of a computer system which maximizes gain for a speakerphone mode of a computer system. In a conventional computer system having a speakerphone mode and non-speakerphone audio modes, the gain of the microphone path in the computer system during a speakerphone mode is interdependent with the gain of the microphone path in the computer system during non-speakerphone audio modes. Therefore, a computer system having an acoustic path which maximizes gain for a speakerphone mode necessarily maximizes gain for non-speakerphone audio modes as well. During a speakerphone mode of a computer system, users commonly add gain to the microphone path of a computer system through an audio mixer chip to improve the signal-to-noise ratio of sound radiated by the loudspeaker. While a maximization of acoustic gain for a speakerphone mode optimizes acoustic performance, a maximization of acoustic gain for a non-speakerphone audio mode is a maximization of undesirable acoustic feedback. Thus, even if the hidden problem of acoustic feedback noise associated with a non-speakerphone audio modes were known to a user, the user would still be confronted with a tradeoff between maximizing acoustic gain for a speakerphone mode of the computer system and minimizing acoustic gain for non-speakerphone audio modes of the computer system.

SUMMARY OF THE INVENTION

Briefly, the present invention provides a method and apparatus for controlling acoustic gain during a non-speakerphone audio mode of a computer system independent of acoustic gain during a speakerphone mode of the computer system. BIOS code within a non-volatile memory of the computer system detects whether the computer system is in a speakerphone mode or a non-speakerphone audio mode. If the computer system is in a non-speakerphone audio mode, a predetermined upper limit is placed on the gain in the microphone path of the computer system. In this way, the problem of acoustic feedback noise due to high gain in the microphone path of the computer system is eliminated. If the computer system is in a speakerphone mode, an upper limit is not provided for the gain in the microphone path of the computer system, allowing for maximization of gain which optimizes acoustic performance during a speakerphone mode.

In one embodiment of the present invention, the predetermined upper gain limit is applied at a microphone pre-amplifier present in the microphone path of the computer system. Application of the predetermined upper gain limit at the microphone pre-amplifier is controlled by gain control logic coupled to the microphone pre-amplifier. In an alternative embodiment of the present invention, the predetermined upper gain limit is applied at an audio mixer chip present in the microphone path of the computer system during a non-speakerphone audio mode. Application of the predetermined upper gain limit at the audio mixer chip is controlled by a driver which communicates with the audio mixer chip.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
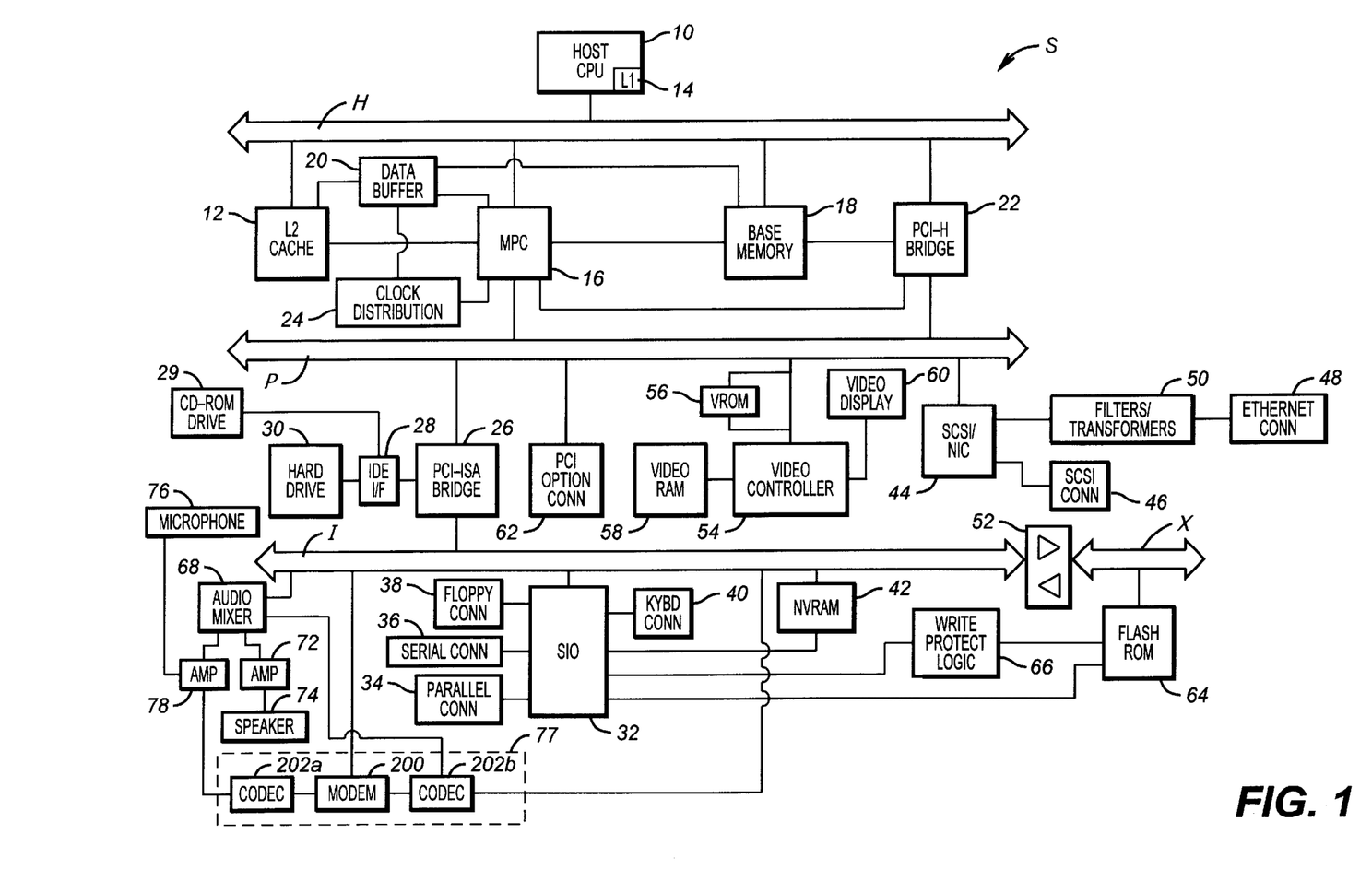
FIG. 1 is a schematic diagram of a computer system showing a microphone pre-amplifier, audio mixer chip, microphone, loudspeaker, and speakerphone.

Turning now to the drawings, FIG. 1 shows a computer system S according to the present invention. Within the computer system S, a CPU 10 and a level two (L2) cache 12 are connected to a high speed host bus H. The processor 10 preferably operates with a standard IBM-PC compatible operating system, such as MS-DOS or Windows. The L2 cache 12 provides additional caching capabilities to the processor's on-chip cache 14 (L1) to improve performance.

In addition to the CPU 10 and caches 12 and 14, a number of memory interface and memory devices are connected between the host bus H and a PCI bus P. These devices include a memory controller 16 such as the memory to PCI cache controller (MPC), a system dynamic random access memory (DRAM) array 18, and a data buffer 20. The memory controller 16 is connected to the host bus H, the PCI-host bridge 22, and the PCI bus P. The memory controller 16 is further connected to clock distribution and generation circuitry 24. The clock circuitry 24, which is connected between the memory controller 16 and the PCI bus P, provides operating timing signals or clocks for the computer system S. The system DRAM 18, which is connected to the host bus H and also connected to the PCI bus P through a PCI-Host bridge 22, is preferably Extended Data Out (EDO) DRAM or Synchronous DRAM (SDRAM). The L2 cache 12 is preferably capable of caching the entire main memory 18. The data buffer 20 is connected to the PCI bus P and also connected to the host bus H through the L2 cache 12. The memory controller 16, system DRAM 18, and data buffer 20 collectively form a high performance memory system for the computer system S.

The PCI-Host bridge 22, which is connected to the PCI bus P and the host bus H, is provided to convert signals between the two buses. The PCI-Host bridge 22 includes the necessary address and data buffers, latches, and arbitration and bus master control logic for communication between the host bus H and the PCI bus P. The L2 cache 12, system DRAM 18, and PCI-host bridge 22 are preferably integrated into a single chipset.

The input/output bus in the computer system S is preferably the Industry Standard Architecture (ISA) bus I which is connected to the PCI bus P through a PCI to ISA bridge 26. However, it should be understood that other input/output buses may also be used. The PCI to ISA bridge 26 provides various support functions for the computer system S. Preferably the PCI-ISA bridge 26 is a single integrated circuit that acts as a PCI bus master and slave, an ISA bus controller, an ISA write posting buffer, an ISA bus arbiter, DMA devices, and an IDE disk interface. The bridge 26 is also connected to an IDE interface port 28 for driving one or more peripherals such as a hard disk drive 30 and a CD-ROM drive 29.

The PCI-ISA bridge 26 is connected to the ISA bus I which is connected to an SIO (super I/O) chip 32. The SIO 32 provides a parallel port 34, a serial port 36, a floppy interface 38, a keyboard interface 40, and a non-volatile random access memory 42 (NVRAM). In addition, a Small Computer Systems Interface (SCSI) and network interface controller (NIC) 44 are connected to the PCI bus P. Preferably the SCSI/NIC 44 is a single integrated circuit and includes the capabilities necessary to act as a PCI bus master or slave and circuitry to act as a SCSI controller and local area network (LAN) or Ethernet interface. A SCSI connector 46 is connected to the controller 44 to allow connection of various SCSI devices, such as hard disk drives and CD-ROM drives. An Ethernet connector 48 is provided also and is connected to filter and transformer circuitry 50 which in turn is connected to the controller 44. This forms a network or Ethernet connection for connecting the computer system S to a local area network (LAN). Also, an external bus X is connected to the ISA bus I through a buffer 52.

The computer system S is shown with exemplary video devices. A video controller 54 and video ROM 56 is connected to the PCI bus P. While preferably the video controller 54 is a VGA (video graphics adaptor) controller, other video controllers are known and also may be used. The video controller 54 controls the operation of the video ROM 56, allowing video data to be written, stored, and retrieved as required. The video data may also be temporarily stored in the video RAM 58 which is connected to the video controller 54. The video controller 54 is further connected to a video display screen 60 such as a LCD. In addition, a PCI option connector 62 is preferably connected to the PCI bus P. As well, the system S may have a plurality of PCI and ISA type peripherals on their respective buses.

Figure 5A:
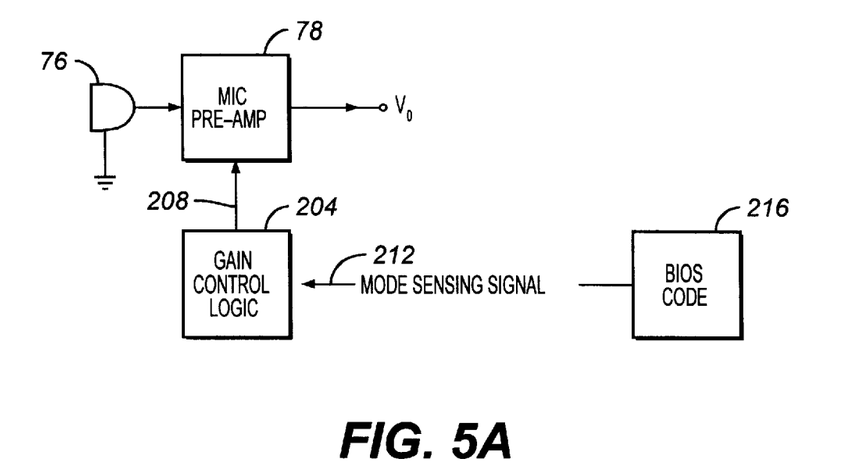
FIG. 5A is a schematic diagram of an embodiment of the present invention including gain control logic coupled to the microphone pre-amplifier of FIG. 1.
Figure 5B:
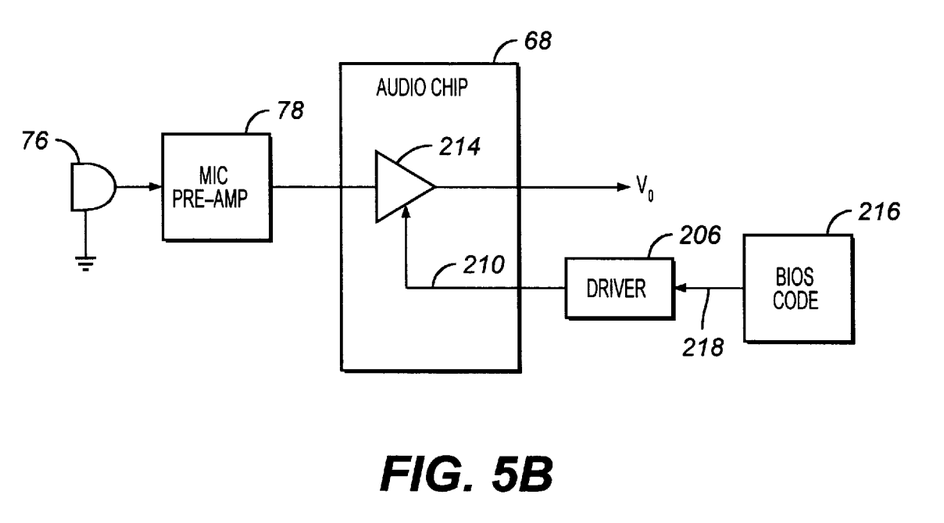
FIG. 5B is a schematic diagram of an embodiment of the present invention including a driver for communicating with the audio mixer chip of FIG. 1.

In the computer system S, flash ROM 64 holds the BIOS code 216 (FIGS. 5A and 5B). The BIOS code 216 includes both routines executed during boot up of the computer system S and runtime routines. The parallel-access flash ROM 64 is typically located off of the external bus X and is connected to the SIO (super I/O) chip 32. The flash ROM 64 receives its control, address, and data signals from the SIO chip 32. The flash ROM 64 is further connected to write-protect logic 66 which is also connected to the SIO chip 32.

A sound or audio mixer chip 68 such as the ESS 1869 available from ESS Technology, Inc. for mixing audio signals is coupled to the ISA bus I. The sound chip 68 is coupled to a microphone pre-amplifier 78 and a speaker pre-amplifier 72. The speaker pre-amplifier 72 is coupled to a loudspeaker 74. The microphone pre-amplifier 78 is coupled to a microphone 76 and a coder-decoder (CODEC) 202a which is coupled to a modem 200. The modem 200 is further coupled to a second coder-decoder 202b. The CODECs 202a and 202b and modem 200 collectively form a speakerphone 77. The speakerphone 77 preferably has a full-duplex mode. The speakerphone mode of the computer system S may be enabled by a speakerphone software application controlled by the system processor 10. Further, the audio mixer chip 68 is coupled to the coder-decoder 202b which is coupled to the ISA bus I.

Figure 2:
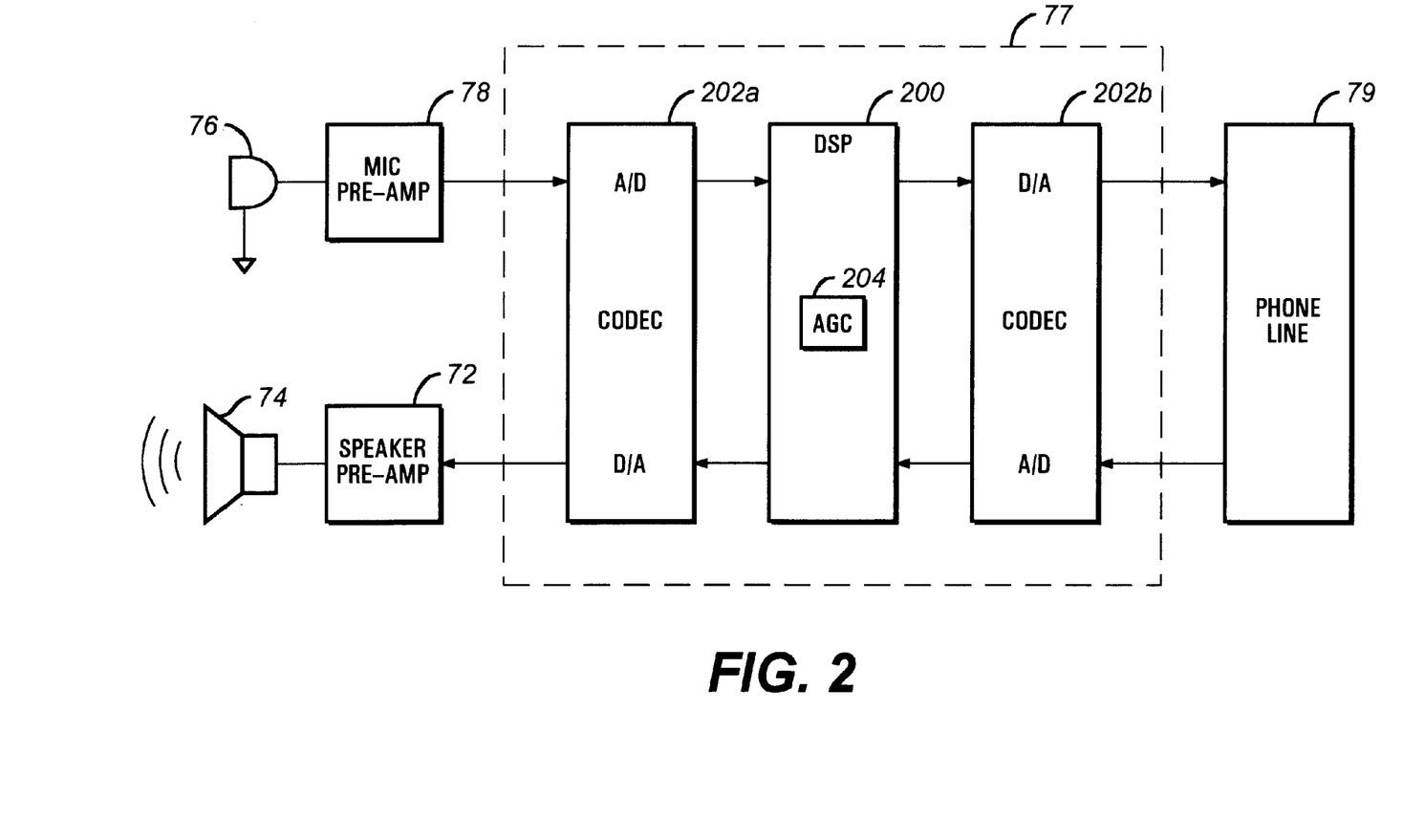
FIG. 2 is a schematic illustration of the acoustic loop for the speakerphone of FIG. 1.

Referring to FIG. 2, the acoustic loop for the loudspeaker 74 and microphone 76 during a speakerphone mode of the computer system S is shown. In the acoustic loop, the microphone 76 detects acoustic energy such as human speech and converts that acoustic energy to electrical signals. The electrical signals are provided to a microphone pre-amplifier 78. The design and operation of a microphone pre-amplifier 78 is known in the art. The pre-amplifier 78 provides the amplified signal to a CODEC 202a. The CODEC 202a converts the analog signal detected by the microphone 76 to a digital signal. That digital signal is then provided to a digital signal processor (DSP) or modem 200. The DSP 200 includes a typical automatic gain control (AGC) circuit 204. This circuit 204, which is included in the microphone path of the computer system S during a speakerphone mode, provides a suitable gain to prevent acoustic feedback noise. The digital signal processed by the DSP 200 is provided to another CODEC 202*b* which converts the signal to analog form for transmission over a phone line 79.

An analog signal received from the phone line 79 is provided to the CODEC 202*b*. The CODEC 202*b* converts the analog signal to digital form and provides that digital signal to the DSP 200. The automatic gain control circuit 204 of the DSP 200 provides suitable gain to the signal to prevent acoustic feedback noise. The DSP 200 provides the processed signal to the CODEC 202*a*. The CODEC 202*a* converts the digital signal to analog form and provides the analog signal to the speaker pre-amplifier 72. An amplified signal is provided by the speaker pre-amplifier 72 to the loudspeaker 74. The loudspeaker 74 radiates acoustic energy based on the amplified signal. Certain devices typically present in a speakerphone 77 such as attenuators, level detectors, sidetone circuitry, and hybrid amplifiers that are unnecessary to an understanding of the present invention are not shown.

Figure 3:
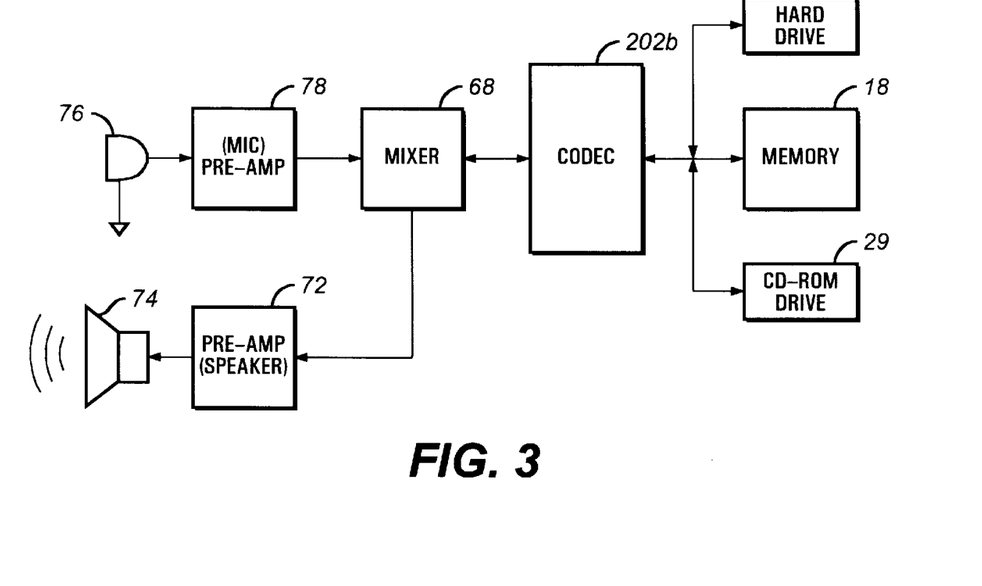
FIG. 3 is a schematic diagram of the microphone path for the loudspeaker and microphone of FIG. 1 during a non-speakerphone audio mode.

Referring to FIG. 3, the microphone path for a non-speakerphone audio mode of the computer system S is shown. For both a speakerphone mode and a non-speakerphone audio modes, the microphone pre-amplifier 78 is included in the microphone path of the computer system S. While the audio mixer chip 68 is not included in the microphone path of the computer system S for a speakerphone mode, the audio mixer chip 68 is included in the microphone path of the computer system S for a non-speakerphone audio mode. In a non-speakerphone audio mode, the microphone pre-amplifier 78 provides signals to the audio mixer chip 68, and the audio mixer chip 68 then provides signals to the CODEC 202*b*. While the microphone pre-amplifier 78 provides signals directly to a CODEC 202*a* during a speakerphone mode (FIG. 2), signals from the microphone 74 are provided to the mixer 68 before being provided to a CODEC 202*b* for non-speakerphone audio modes. The CODEC 202*b* may be coupled to any medium for storing digital data such as a memory 18, hard drive 30, or CD-ROM drive 29. During a non-speakerphone audio mode such as a recording mode, sound at the microphone 76 is detected. The CODEC 202*b* converts the analog sound signals to digital form. The digital data representative of the detected sound is then stored in a suitable medium.

The audio mixer chip 68 is further coupled to the speaker pre-amplifier 72 which is coupled to the loudspeaker 74. In a non-speakerphone audio mode such as a playback mode, the digital data corresponding to acoustic signals and stored in a suitable medium is provided to the CODEC 202*b*. The CODEC 202*b* converts the data from digital form to analog form. The CODEC 202*b* then provides the analog signals to the mixer 68. The design and operation of an audio mixer chip for an audio mode of a computer system is known in the art. The mixer 68 provides the analog electrical signals to the speaker pre-amplifier 72. The amplified signals generated by the speaker pre-amplifier 72 are provided to the loudspeaker 74. The loudspeaker 74 radiates acoustic signals corresponding to the retrieved digital data.

Often in a computer system, a loudspeaker and microphone are turned on for various modes of a computer system such as a speakerphone mode or non-speakerphone audio modes. Examples of non-speakerphone audio modes include a recording mode, a playback mode, and an idle mode. When both the microphone and loudspeaker are turned on but not in use, noise has been generated and amplified by the acoustic loop formed by the microphone and loudspeaker. In a speakerphone mode of a computer system, an automatic gain control circuit of a digital signal processor has been used to reduce the gain in the acoustic loop thereby eliminating such noise. However, in a non-speakerphone audio mode of a computer system, a digital signal processor is not included in the acoustic or microphone path of the computer system. Since the automatic gain control circuit of the digital signal processor is not within the microphone path of a computer system during a non-speakerphone audio mode, noise is undesirably generated and amplified by the acoustic loop formed by the microphone and loudspeaker in a non-speakerphone audio mode.

The amplified noise is received and acoustically transmitted by the loudspeaker. Since the loudspeaker is acoustically coupled to the microphone, the amplified noise returns again to the microphone and is again amplified by the acoustic loop formed by the microphone and loudspeaker. The microphone and loudspeaker of the computer system thus are placed into a feedback loop of a high gain, rendering the computer system acoustically unstable. The resulting acoustic feedback is manifested to a user as an irritating whining or screaming noise.

When the acoustic feedback takes the form of this irritating whining noise, the computer user may be operating other applications of the computer system such that the source of the noise is hidden or not apparent to the user. The user therefore is required to interrupt its use of these applications in an effort to determine the source and cause of the irritating noise. Such a determination is particularly challenging to a user where the user has exited the particular software application in which the microphone and loudspeaker were turned on.

Moreover, the hidden problem of feedback noise generated in a non-speakerphone audio mode of a computer system is propounded by a microphone path of a computer system which maximizes gain for a speakerphone mode of a computer system. In a conventional computer system having a speakerphone mode and non-speakerphone audio modes, the gain of the acoustic path in the computer system during a speakerphone mode is interdependent with the gain of the microphone path in the computer system during non-speakerphone audio modes. Therefore, a computer system having a microphone path which maximizes gain for a speakerphone mode necessarily maximizes gain for non-speakerphone audio modes as well. During a speakerphone mode of a computer system, users commonly add gain to the microphone path of a computer system through an audio or sound chip to improve the signal-to-noise ratio of sound radiated by the loudspeaker. While a maximization of acoustic gain for a speakerphone mode optimizes acoustic performance, a maximization of acoustic gain for a non-speakerphone audio mode is a maximization of undesirable acoustic feedback. Thus, even if the hidden problem of acoustic feedback noise were known to a user, the user would still be confronted with a tradeoff between maximizing acoustic gain for a speakerphone mode of the computer system and minimizing acoustic gain for non-speakerphone audio modes of the computer system.

Figure 4:
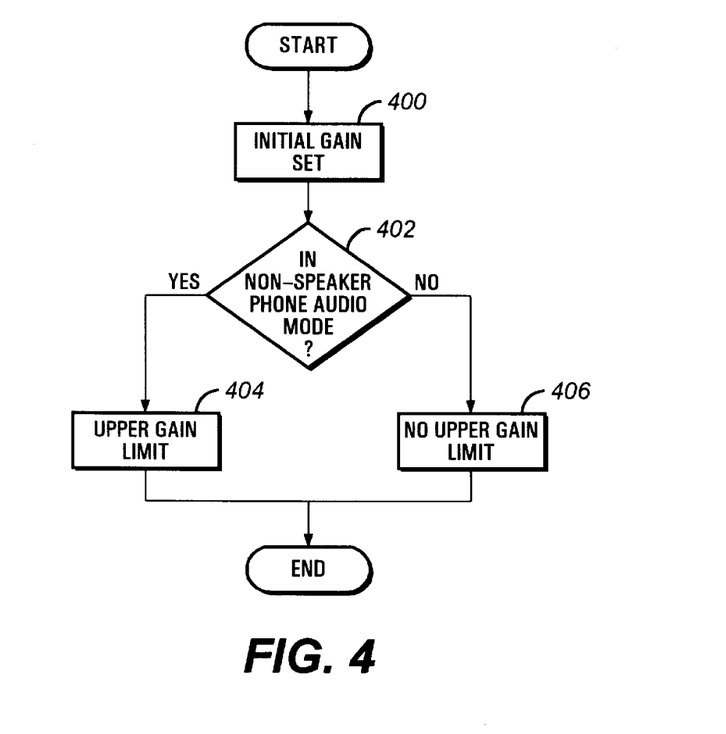
FIG. 4 is a flowchart of the steps for the gain control process of the present invention.

The present invention solves the problem of acoustic feedback noise during a non-speakerphone audio mode by providing a method and apparatus for controlling acoustic gain during a non-speakerphone audio mode of a computer system S independent of acoustic gain during a speakerphone mode of the computer system S. Referring to FIG. 4, in step 400, an initial gain is applied to the microphone path during setup of the computer system S. The initial gain set may a high gain for a speakerphone mode of the computer system S or a low gain for a non-speakerphone mode. Next, in step 402, it is determined whether the computer system S is in a non-speakerphone mode. This detection step is repeatedly or continuously performed such that any transition between a speakerphone mode and a non-speakerphone audio mode is detected.

The detection of whether the computer system S is a speakerphone mode or a non-speakerphone mode is preferably made by BIOS code 216 (FIGS. 5A and 5B) in the flash ROM 64 of the computer system S; however, it should be understood that any component of a computer system capable of detecting when a computer system S is in a non-speakerphone audio mode may be used. If the computer system S is in a non-speakerphone audio mode, control proceeds to step 404 wherein a predetermined upper limit is placed on the gain in the microphone path of the computer system S. In this way, the problem of microphone feedback noise due to high gain in the acoustic path of the computer system S is eliminated. When the computer system S is in a speakerphone mode, control proceeds to step 406 wherein a upper gain limit is not applied to the microphone path of the computer system S, allowing for maximization of gain which optimizes acoustic performance during a speakerphone mode.

Referring to FIG. 5A, an embodiment of the present invention including gain control logic 204 coupled to the microphone pre-amplifier 78 is shown. The gain control logic 204 controls whether the gain provided by the microphone pre-amplifier 78 is limited to a predetermined upper gain value. The gain control logic 204 is preferably a MOSFET switch which receives a mode sensing signal 212. The gain control logic 204 preferably receives the mode sensing signal 212 from the BIOS code 216. The mode sensing signal 212 is either a speakerphone mode signal or a non-speakerphone audio mode signal. In a speakerphone mode of the computer system S, the gain control logic 204 receives a speakerphone mode signal. In response to the speakerphone mode signal, the gain control logic 204 provides a switching signal 208 placing the microphone pre-amplifier 78 in a high gain state in which the gain provided by the microphone pre-amplifier 78 is not limited to an upper gain value. In this way, in accordance with the present invention, the gain in the microphone path of the computer system S may be maximized during a speakerphone mode without affecting the gain in the microphone path of the computer system S during a non-speakerphone mode.

In a non-speakerphone audio mode of a computer system S, the gain control logic 204 receives a non-speakerphone audio mode signal. In response to the non-speakerphone audio mode signal, the gain control logic 204 provides a switching signal 208 placing the microphone pre-amplifier 78 in a low gain state in which the gain provided by the microphone pre-amplifier 78 is limited to a predetermined upper gain value. The upper gain value is selected such that gain in the microphone path of the computer system S during a non-speakerphone audio mode does not reach a gain level sufficient to produce acoustic feedback noise irritating to a user. The upper gain value thereby serves as a low noise floor for the microphone pre-amplifier 79. It should be understood that hardware components other than a MOSFET switch which are capable of providing a switching signal responsive to a mode sensing signal may also be used as the gain control logic 204.

Figure 6:
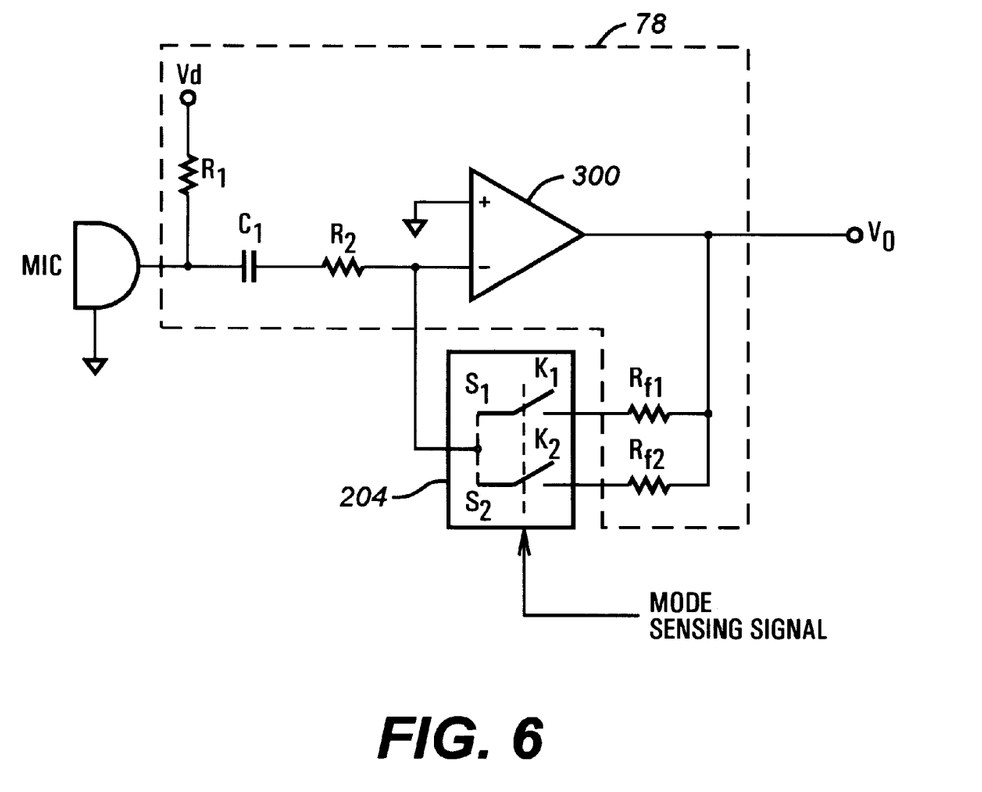
FIG. 6 is an electrical circuit schematic diagram of an example of a circuit embodiment for the schematic embodiment of FIG. 5A.

Referring to FIG. 6, an example of a circuit embodiment of the schematic embodiment for FIG. 5A is shown. The microphone pre-amplifier schematically indicated in broken line 78 includes input resistors $R_1$ and $R_2$, an input capacitor $C_1$, an operational amplifier 300, a low feedback resistor $R_{f1}$, and a high feedback resistor $R_{f2}$. The impedance combination of the capacitor $C_1$, resistors $R_1$ and $R_2$, and operational amplifier 300 defines the frequency response of the microphone pre-amplifier 78. The gain control logic 204 is implemented as an analog switch. The analog switch 204 includes a switch path $S_1$ with a switch constant $K_1$ and a switch path $S_2$ with a constant $K_2$. The switch paths $S_1$ and $S_2$ are alternative in operation. When switch path $S_1$ is open, switch path $S_2$ is closed. When switch path $S_2$ is open, switch path $S_1$ is closed. The output voltage $V_0$ of the microphone pre-amplifier 78 is a function of the switch-constant corresponding to the closed switch path. If the mode sensing signal 212 indicates the computer system S is in a non-speakerphone mode, switch path $S_2$ opens and switch path $S_1$ closes to select the low feedback resistor $R_{f1}$ and switch constant $K_1$, thereby decreasing the gain in the microphone path. If the mode sensing signal 212 indicates the computer system S is in a speakerphone mode, switch path $S_1$ opens and switch path $S_2$ closes to select the high feedback resistor $R_{f2}$ and switch constant $K_2$, thereby increasing the gain in the microphone path.

Referring to FIG. 5B, an alternative embodiment of the present invention including an audio mixer driver 206 for communicating with the audio mixer chip 68 is shown. The audio mixer chip 68 allows for a driver 206 which communicates with the audio mixer chip 68 over an input/out bus such as the ISA bus I. The driver 206 preferably interfaces with BIOS code 216 to detect whether the computer system S is in a non-speakerphone audio mode. For example, the BIOS code 216 may provide a mode sensing signal 218 to the driver 206 for indicating whether the computer system S is in a non-speakerphone audio mode. The driver 206 provides a digital gain control signal 210 to a variable gain amplifier 214 of the audio mixer chip 68. If the driver 206 receives a mode sensing signal 218 indicating the computer system S is in a speakerphone mode, the digital gain control signal 210 provided by the driver 206 switches the variable gain amplifier 214 to a low gain state in which the gain of the amplifier 214 is not limited to an upper gain value. In this way, in accordance with the present invention, the gain in the microphone path of the computer system S may be maximized during a speakerphone mode without affecting the gain in the microphone path of the computer system S during a non-speakerphone mode.

If the driver 206 receives a mode sensing signal 218 indicating the computer system S is in a non-speakerphone audio mode, the digital gain control signal 210 provided by the driver 206 switches the variable gain amplifier 214 to a low gain state in which the gain of the amplifier 214 is limited to a predetermined upper gain value. The upper gain value is selected such that gain in the microphone path of the computer system S during a non-speakerphone audio mode does not reach a gain level sufficient to produce acoustic feedback noise irritating to a user. The upper gain value thereby serves as a low noise floor for the audio mixer chip 68. In addition to the microphone pre-amplifier 78 and the audio mixer 68, it should be understood that gain control may be directed to any point in the microphone path of the computer system S where acoustic gain may be adjusted.

The present invention thus allows for gain control during non-speakerphone modes of a computer system independent of the gain during a speakerphone mode. By controlling acoustic gain during non-speakerphone modes, acoustic feedback noise associated with non-speakerphone modes of conventional computer systems is eliminated.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A computer system adapted for gain control in a non-speakerphone audio mode of the computer system independent of gain control in a speakerphone mode of the computer system, the computer system comprising:
   a processor capable of running an application to place the computer system in a speakerphone mode and an application to place the computer system in a non-speakerphone mode;
   a microphone for converting acoustic signals to electrical signals in the speakerphone mode and the non-speakerphone audio mode;
   a loudspeaker coupled to said microphone for converting electrical signals indicative of sound to acoustic signals;
   a microphone path formed by and between said microphone and said loudspeaker; and
   a gain control means for limiting acoustic gain in said microphone path to a predetermined low gain level if the computer system is in a non-speakerphone mode, a telephone line not being in the microphone path during the non-speakerphone mode.

2. The computer system of claim 1, wherein said gain control means comprises an analog switching means for selecting and deselecting the predetermined low gain level.

3. The computer system of claim 1, wherein said gain control means comprises an audio mixer driver means for selecting and deselecting the predetermined low gain level.

4. The computer system of claim 1, further comprising:
   a means for detecting if the computer system is in a speakerphone mode or a non-speakerphone audio mode and communicating the detection to said gain control means.

5. The computer system of claim 4, wherein said means for detecting if the computer system is in a speakerphone mode or in a non-speakerphone audio mode comprises BIOS code.

6. The computer system of claim 1, wherein said gain control means limits acoustic gain at a microphone pre-amplifier in said microphone path.

7. The computer system of claim 4, wherein said gain control means limits acoustic gain at an audio mixer in said microphone path.

8. A computer system adapted for gain control in a non-speakerphone audio mode of the computer system independent of gain control in a speakerphone mode of the computer system, the computer system comprising:
   a processor capable of running an application to place the computer system in a speakerphone mode and an application to place the computer system in a non-speakerphone audio mode;
   a microphone for use in the speakerphone mode and non-speakerphone audio modes;
   a microphone pre-amplifier coupled to said microphone for providing acoustic gain, said microphone pre-amplifier including a first feedback resistor network and a second feedback resistor network, the first feedback resistor network having a high feedback resistance and the second feedback resistor network having a low feedback resistance; and
   gain control logic for selecting the second feedback resistor network to apply a predetermined upper gain limit to the acoustic gain provided by said microphone pre-amplifier if the computer system is in a non-speakerphone audio mode and selecting the first feedback resistor network so as not to apply the predetermined gain limit to the acoustic gain provided by said microphone pre-amplifier if the computer system is in a speakerphone mode, a telephone line not being in the microphone path during the non-speakerphone mode.

9. The computer system of claim 8, further comprising:
   BIOS code providing a mode sensing signal to said gain control logic for indicating if the computer system is in a speakerphone mode or a non-speakerphone audio mode.

10. The computer system of claim 8, wherein said gain control logic provides a switching signal to said microphone pre-amplifier to switch said microphone pre-amplifier to a low gain state if the computer system is in a non-speakerphone audio mode and to switch said microphone pre-amplifier to a high gain state if the computer system is in a speakerphone mode.

11. The computer system of claim 10, wherein if said microphone pre-amplifier is in a high gain state, the first feedback resistor network is selected so as not to apply a predetermined upper gain limit to said microphone pre-amplifier.

12. The computer system of claim 10, wherein if said microphone pre-amplifier is in a low gain state, the second feedback resistor network is selected to apply a predetermined upper gain limit to said microphone pre-amplifier.

13. The computer system of claim 8, wherein said gain control logic is a MOSFET switch.

14. The computer system of claim 8, further comprising:
   a loudspeaker acoustically coupled to said microphone in the speakerphone mode and the non-speakerphone audio mode.

15. A computer system adapted for gain control in a non-speakerphone audio mode of the computer system independent of gain control in a speakerphone mode of the computer system, the computer system comprising:
   a processor capable of running an application to place the computer system in a speakerphone mode and an application to place the computer system in non-speakerphone audio modes;
   a microphone for use in the speakerphone mode and the non-speakerphone modes;
   a microphone pre-amplifier coupled to said microphone for providing acoustic gain;
   an audio mixer coupled to said microphone pre-amplifier for providing acoustic gain, said audio mixer including an adjustable gain microphone pre-amplifier; and
   an audio mixer driver for communicating with said audio mixer, said audio mixer driver setting a predetermined upper gain limit for the acoustic gain provided by said audio mixer if the computer system is in a non-speakerphone audio mode and not setting an upper gain limit for the acoustic gain provided by said audio mixer if the computer system is in a speakerphone mode.

16. The computer system of claim 15, further comprising:
   BIOS code providing a mode sensing signal to said audio mixer driver for indicating if the computer system is in a speakerphone mode or a non-speakerphone audio mode.

17. The computer system of claim 15, wherein said audio mixer driver provides a digital gain control signal to said adjustable gain microphone pre-amplifier of said audio mixer to set said adjustable gain microphone pre-amplifier to a low gain state if the computer system is in a non-speakerphone audio mode and to set said adjustable gain microphone pre-amplifier to a high gain state if the computer system is in a speakerphone mode.

18. The computer system of claim 17, wherein a predetermined upper gain limit is set for the acoustic gain provided by said adjustable gain microphone pre-amplifier of said audio mixer if the adjustable gain microphone pre-amplifier is in a low gain state.

19. The computer system of claim 17, wherein a predetermined upper gain limit is not set for the acoustic gain provided by said adjustable gain microphone pre-amplifier of said audio mixer if the adjustable gain microphone pre-amplifier is in a high gain state.

20. The computer system of claim 15, further comprising:
a loudspeaker acoustically coupled to said microphone in the speakerphone mode and the non-speakerphone audio modes.

21. A method of controlling acoustic gain in a microphone path of a computer system in a non-speakerphone audio mode independent of acoustic gain in the microphone path in a speakerphone mode, comprising the steps of:
detecting if a computer system is in a speakerphone mode or a non-speakerphone audio mode; and
applying a predetermined upper gain limit to the microphone path if the computer system is in a non-speakerphone audio mode, a telephone line not being in the microphone path during the non-speakerphone audio mode.

22. The method of claim 21, wherein said applying step comprises the step of applying a predetermined upper gain limit at a microphone pre-amplifier in the microphone path.

23. The method of claim 21, wherein said applying step comprises the step of applying a predetermined upper gain limit at an audio mixer in the microphone path.

24. A method of controlling acoustic gain in a microphone path of a computer system in a non-speakerphone audio mode independent of acoustic gain in the microphone path in a speakerphone mode, the microphone path including a microphone pre-amplifier coupled to a microphone, comprising the steps of:
detecting if the computer system is in a speakerphone mode or a non-speakerphone audio mode;
placing the microphone pre-amplifier in a low gain state if the computer system is in a non-speakerphone audio mode, a telephone line not being in the microphone path during the non-speakerphone mode; and
placing the microphone pre-amplifier in a high gain state if the computer system is in a speakerphone mode.

25. The method of claim 24, wherein said step of placing the microphone pre-amplifier in a low gain state comprises the step of selecting a low feedback resistance network of the microphone pre-amplifier.

26. The method of claim 24, wherein said step of placing the microphone pre-amplifier in a high gain state comprises the step of selecting a high feedback resistance network of the microphone pre-amplifier.

27. The method of claim 24, wherein the microphone pre-amplifier is an adjustable gain microphone pre-amplifier of an audio mixer chip in the microphone path.

28. The method of claim 27, wherein said placing steps comprise the step of providing a digital gain control signal to the microphone pre-amplifier.

* * * * *